(12) United States Patent
Villano

(10) Patent No.: US 11,697,948 B2
(45) Date of Patent: Jul. 11, 2023

(54) STRUCTURAL SUPPORT, MANUFACTURING PROCESS

(71) Applicant: GUARNIFLON S.P.A., Bergamo (IT)

(72) Inventor: Massimo Villano, Brescia (IT)

(73) Assignee: GUARNIFLON S.P.A., Bergamo (IT)

( * ) Notice: Subject to any disclaimer, the term of this patent is extended or adjusted under 35 U.S.C. 154(b) by 525 days.

(21) Appl. No.: 16/616,428

(22) PCT Filed: May 15, 2018

(86) PCT No.: PCT/IB2018/053378
§ 371 (c)(1),
(2) Date: Nov. 22, 2019

(87) PCT Pub. No.: WO2018/220459
PCT Pub. Date: Dec. 6, 2018

(65) Prior Publication Data
US 2020/0123799 A1    Apr. 23, 2020

(30) Foreign Application Priority Data
May 30, 2017   (IT) .......................... 102017000058974

(51) Int. Cl.
*E04H 9/02* (2006.01)
*E04B 1/36* (2006.01)
(Continued)

(52) U.S. Cl.
CPC .............. *E04H 9/021* (2013.01); *B29C 65/02* (2013.01); *B29C 65/06* (2013.01); *B29C 66/00* (2013.01); *E04B 1/36* (2013.01); *E04B 1/98* (2013.01)

(58) Field of Classification Search
CPC ........... B32B 5/00; B32B 27/08; B32B 27/28; E04B 1/36; Y10T 428/23
See application file for complete search history.

(56) References Cited

U.S. PATENT DOCUMENTS 6,726,994 B1 *  4/2004  Araki .................... F16C 33/201
                                                    428/411.1
8,371,075 B2 *  2/2013  Huber ................... F16C 33/201
                                                    52/167.1

FOREIGN PATENT DOCUMENTS

CN         1437616 A      8/2003
CN       102428128 A      4/2012
(Continued)

OTHER PUBLICATIONS

[NPL-1] "Fluorinated ethylene propylene"; Wikipedia (Oct. 2021); <https://en.wikipedia.org/wiki/Fluorinated_ethylene_propylene>. (Year: 2021).*

(Continued)

*Primary Examiner* — David Sample
*Assistant Examiner* — Donald M Flores, Jr.
(74) *Attorney, Agent, or Firm* — James S. Keddie; Bozicevic, Field & Francis LLP

(57) ABSTRACT

Structural support (1) including a first support portion (2) delimiting at least one containment compartment (4, 4'); a second support portion (6) at least partly in front of the containment compartment (4, 4'); and a sliding element (4), housed in the containment compartment (4, 4') and interposed between the first (2) and the second (6) support portion. The sliding element (8) substantially consists of a thermo-processable fluoro-polymer with a melt-mass flow rate—according to the ISO 1133-1:2011 standard—of less than 5.0 grams/10 minutes, for example under 3.0 grams/10 minutes.

16 Claims, 4 Drawing Sheets

(51) Int. Cl.
    *E04B 1/98*           (2006.01)
    *B29C 65/06*        (2006.01)
    *B29C 65/00*        (2006.01)
    *B29C 65/02*        (2006.01)

(56) References Cited

FOREIGN PATENT DOCUMENTS

| | | |
|---|---|---|
| CN | 104822743 A | 8/2015 |
| CN | 105683601 A | 6/2016 |
| CN | 106661146 A | 5/2017 |
| JP | 2001059544 A * | 3/2001 |
| RU | 99 015 U1 | 11/2010 |
| RU | 2 435 080 C2 | 11/2011 |
| RU | 146 859 U1 | 10/2014 |
| RU | 160 343 U1 | 3/2016 |
| WO | 2009/010487 A1 | 1/2009 |
| WO | 2012/114246 A1 | 8/2012 |
| WO | 2015/136457 A1 | 9/2015 |
| WO | WO-2015136457 A1 * | 9/2015 ............... C08K 3/04 |

OTHER PUBLICATIONS

[NPL-2] "FEP Datasheet and Properties"; Holscot Europe (Jan. 2022), <https://fep-film.com/fep-datasheet-fep-properties/>. (Year: 2022).*

* cited by examiner

STRUCTURAL SUPPORT, MANUFACTURING PROCESS

The present invention relates to a structural support configured to allow relative movements between the parts of a building structure, typically of a translational and/or rotational type, and a method for manufacturing a structural support.

In supports for constructions located in areas of low or zero seismicity, in order to make the sliding surfaces thereof, polymeric materials typically characterised by a low coefficient of friction are typically used.

The material mainly used in these applications is polytetrafluoroethylene (PTFE), indicated as preferred material in the European standard EN 1337-2, and in the US AASHTO LRFD Bridge Design Specifications (mentioned purely by way of example).

In addition to an advantageously low coefficient of friction, PTFE is characterised by a chemical structure that gives it other convenient features, such as negligible hygroscopicity, high chemical resistance and a substantial absence of oxidative phenomena, which make it exceptionally resistant to environmental agents and essentially immune to ageing processes.

Although PTFE is the most used polymeric material for the construction of sliding surfaces of construction bearings, it is known that it has a low characteristic compressive strength (fk) and a high tendency to viscous sliding under certain loading conditions, which limits the bearing capacity of bearings with PTFE sliding surfaces.

Furthermore, the thermal field of use of PTFE in these building applications is limited to the range between −35° C. and 48° C.

As an alternative, in recent years polymers optionally charged—have been proposed as an alternative to PTFE, such as ultra-high molecular weight polyethylene (UHMWPE) or some polyamides.

These alternatives have the advantage of having a higher compressive strength than PTFE. For a prompt comparison, the fk parameter of PTFE—evaluated according to the European standard EN 1337-2—is 90 MPa, while the corresponding value for the UHMWPE is substantially double, of about 180 MPa.

On the other hand, these alternative materials show greater rigidity at low temperatures, greater hygroscopicity and exposure to oxidation phenomena that could accelerate ageing.

Considering what has just been described, there is still the need to find effective alternative solutions for the construction of sliding surfaces that maintain the distinctive properties of PTFE, and which at the same time can have a high compressive strength, at least comparable to that of UHMWPE or of polyamides.

The present invention falls within the above context, proposing to provide a structural support and a method of manufacturing a structural support comprising a special thermo-processable fluoropolymer, which exhibits an improved compressive strength and a less viscous sliding with respect to the PTFE currently on the market.

The above objectives are thus achieved by a structural support according to claim 1, and by a process according to claim 11. The dependent claims describe preferred or advantageous embodiments.

The present invention will now be described in detail with the aid of the accompanying drawings, provided by way of non-limiting example, in which.

The above objective is achieved through a process for the construction of a structural support.

According to an embodiment, this method is aimed at manufacturing the structural support 1 according to any variant described below, and illustrated in the accompanying figures.

Figure 1:
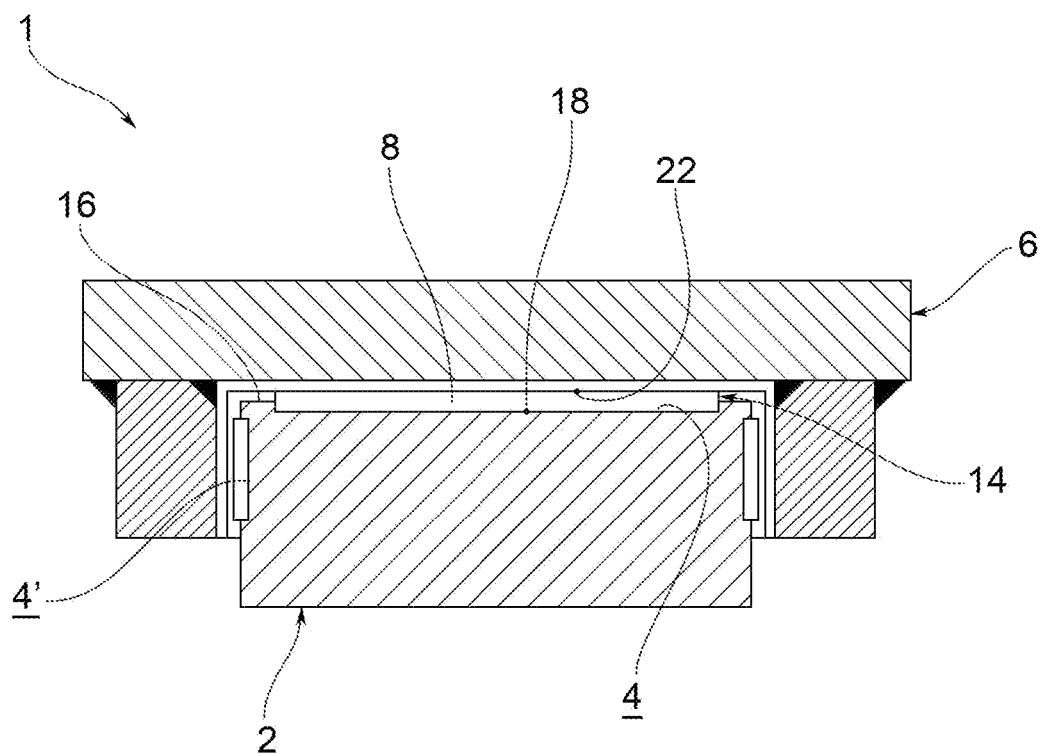
FIGS. 1, 2, 7, 8, 9, 10 show structural supports according to the present invention, according to possible embodiments.
Figure 2:
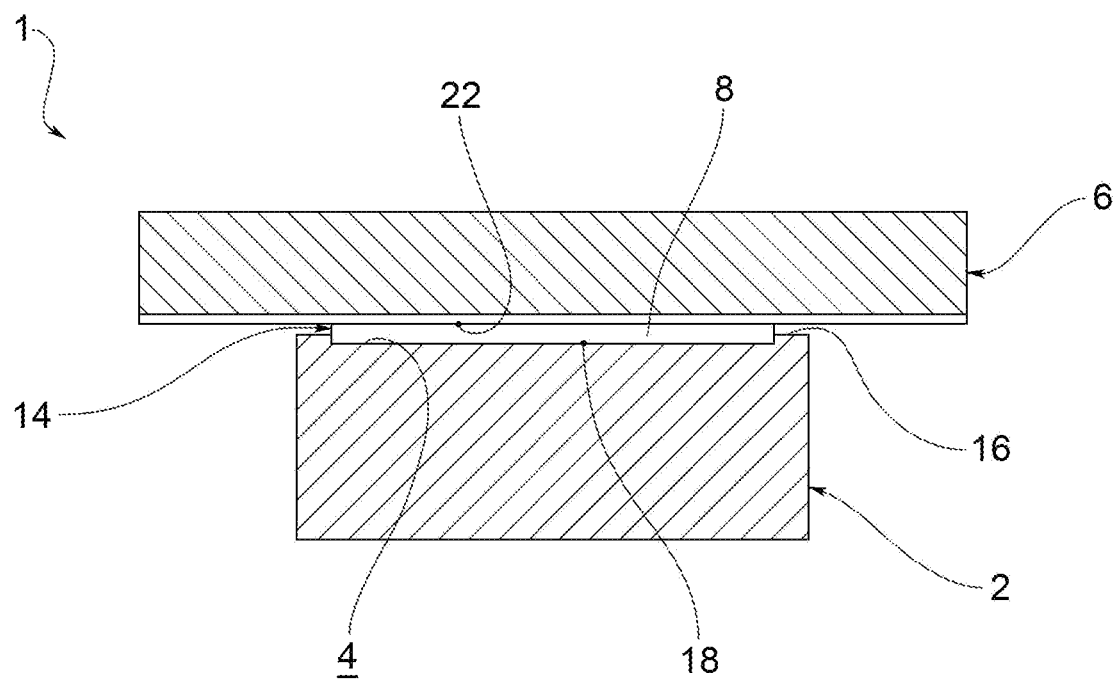
Figure 7:
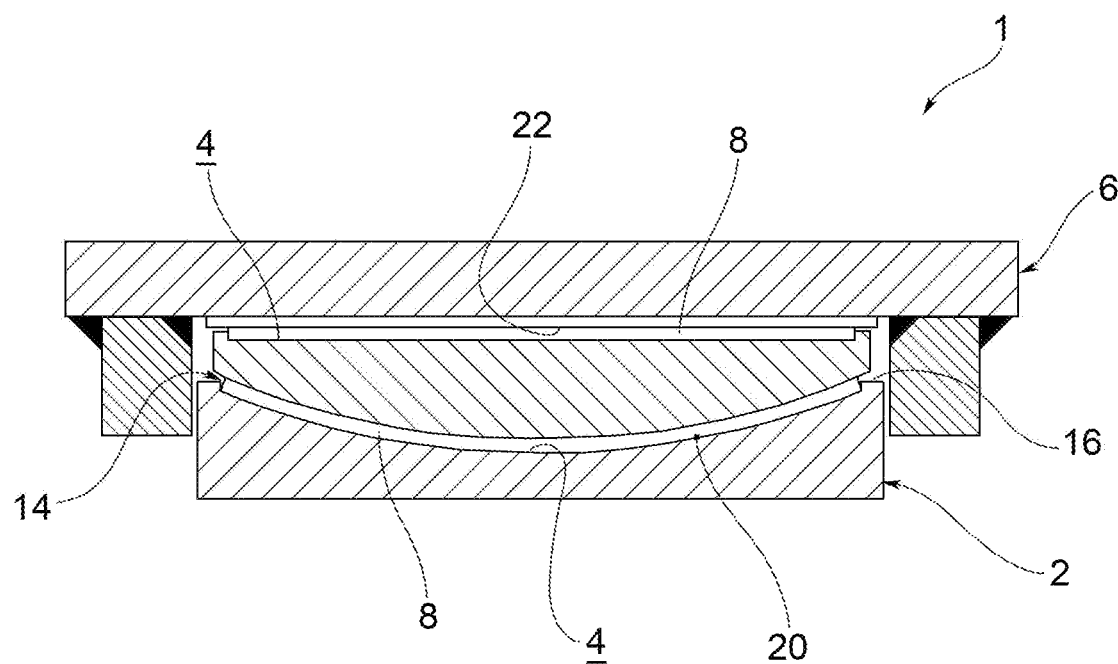
Figure 8:
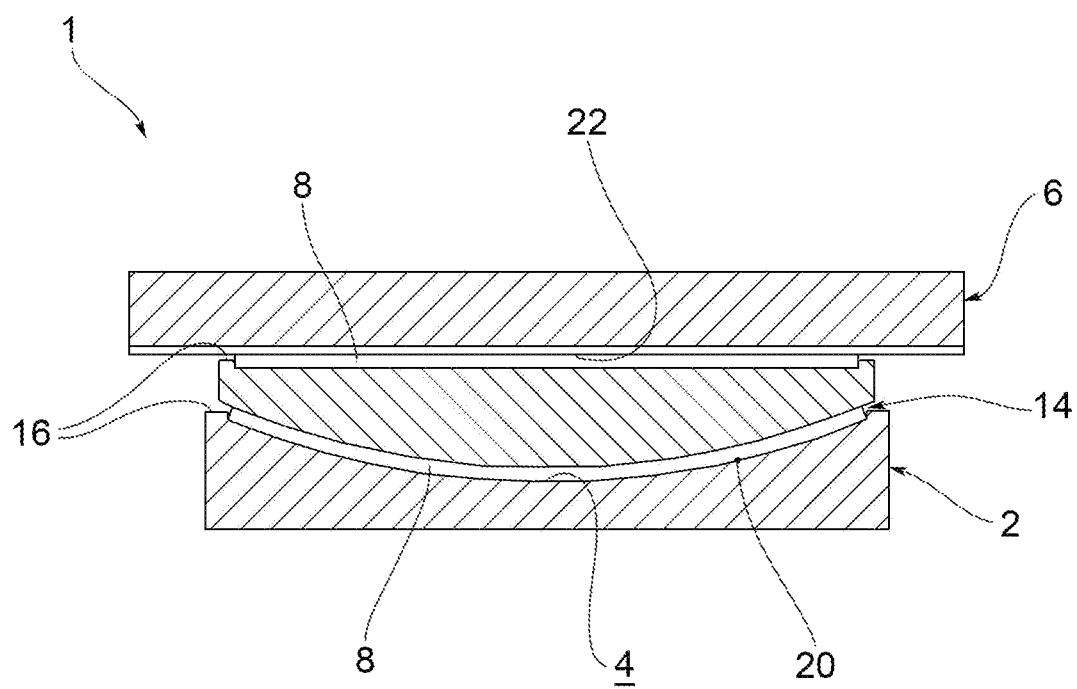
Figure 9:
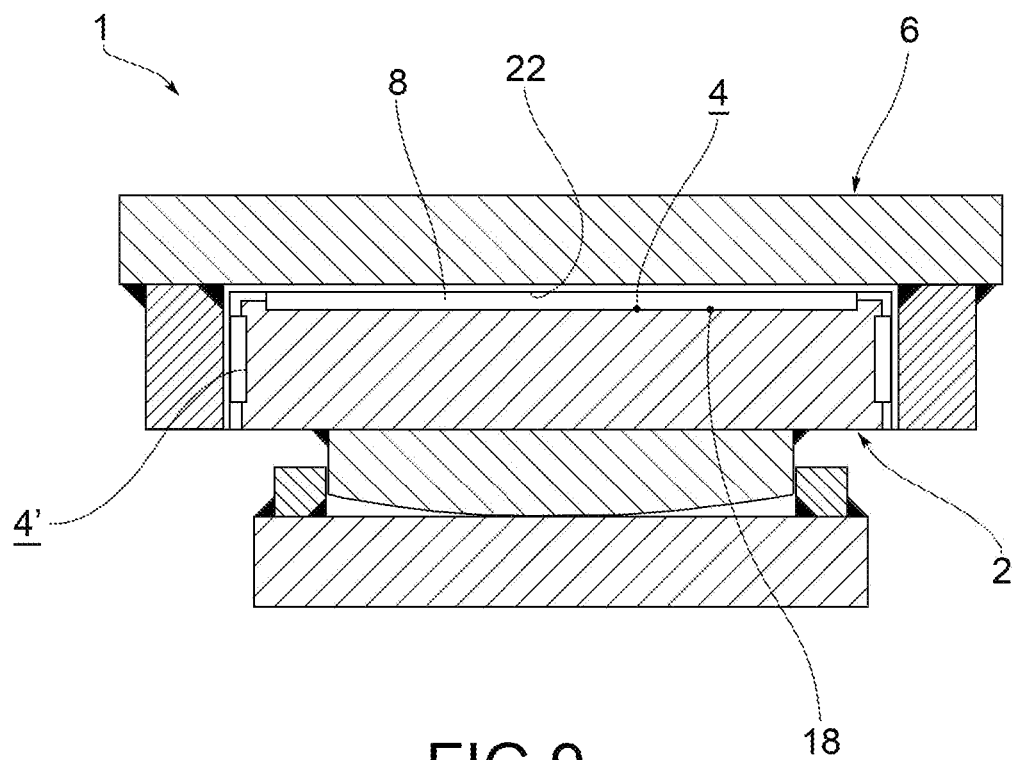
Figure 10:
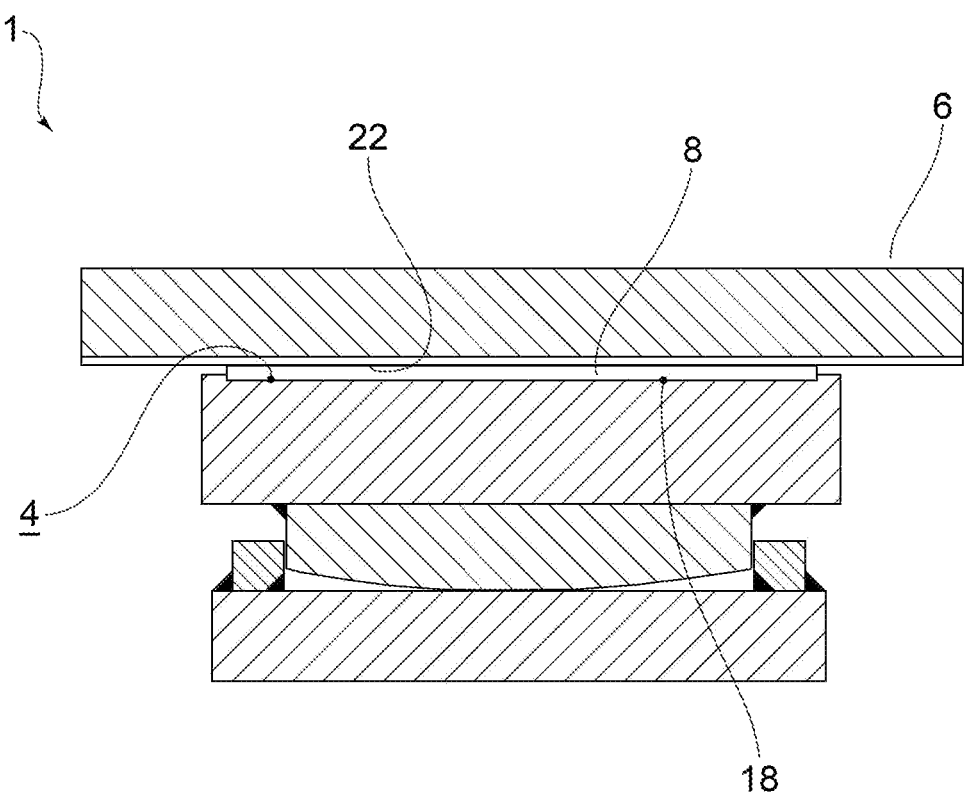

According to an embodiment, the structural support 1 may be guided (for example, see FIG. 7 or FIG. 9), or not guided (FIG. 2 or FIG. 8).

This process comprises the steps of:

i) providing a first support portion 2 delimiting at least one containment compartment 4, 4';

ii) providing a sliding element 8 substantially consisting of a thermo-processable fluoro-polymer with a melt-mass flow rate (MFR)—according to the ISO 1133-1:2011 standard—of less than 5 grams/10 min and more precisely under 3.0 grams/10 minutes;

iii) partly housing the sliding element 8 in the containment compartment 4, 4';

iv) placing at least part of a second support portion 6 in a position in front of the containment compartment 4, 4' so that the sliding element 8 is interposed between said support portions 2, 6.

According to an embodiment, the first support portion 2 delimits more than one containment compartments 4, 4'.

According to an embodiment, the first support portion 2 delimits an upper containment compartment 4, and at least one or more lateral containment compartments 4'.

According to an embodiment, the lateral containment compartment 4' (or the plurality thereof) develops about 90° with respect to the upper containment compartment 4, and in particular with respect to a bottom surface 18 of the latter.

According to an embodiment, the containment compartment 4, 4' is delimited by a substantially planar bottom surface 18.

According to an embodiment, the containment compartment 4 is delimited by a concave bottom surface 20 (e.g. cylindrical or semi-spherical).

As regards the definition of the term "thermo-processable" according to the present description, the publications "Fluoroplastics—The Definitive User's Guide and Data Book" (Plastics Design Library), second edition, by the author Sina Ebnesajjad and published by Elsevier, distinguish polymers based on tetrafluoroethylene in two types: volume 1 relates to the so-called "Non-melt processible fluoropolymers", polymers having such a high viscosity in the molten state as to prevent heat transformations thereof, while volume 2 relates to thermo-processable polymers ("melt processible fluoropolymers") which on the contrary can—by pure example—be injected or hot extruded by virtue of their lower viscosity in the molten state.

Therefore, the polymers of relevance for this description are those listed in volume 2 of the above manual. More specifically, on page 57, paragraph 4.9, such a volume identifies possible standard production techniques for this type of fluorine-polymer.

According to an embodiment, the thermo-processable fluorine-polymer has an MFR in the range of 0.2-5.0 grams/

10 min, optionally in the range of 0.8-3.0 grams/10 minutes, for example comprised in the range 0.8-2.0 grams/10 minutes.

According to possible embodiments, the sliding element 8 may be in the form of a plate, a strip or a film.

According to an embodiment, a portion 14 of the sliding element 8 projects outside the containment compartment 4, 4'.

According to an embodiment, this projecting portion 14 has a maximum height—with respect to a free edge 16 of the first support portion 2—of at least 2.0 mm.

According to an embodiment, step ii) comprises sub-steps of:

a) providing a powder or a pellet of a thermo-processable fluoro-polymer having an average micrometric particle size of about 0.05-2000 micrometres;

b) optionally mixing one or more fillers, of the organic and/or inorganic type, with said powder or pellet;

c) compacting the powder or pellets of sub-step a) or the product of sub-step b) by compression;

d) hot compression sintering the product of sub-step c) to obtain the sliding element 8 or a cylindrical semi-finished product.

According to an embodiment, the average particle size is about 0.05-200 micrometres, for example in the range of 0.05-100 micrometres.

According to an embodiment, the average particle size is about 1.0-50 micrometres.

According to various embodiments, the powder or pellets of sub-step a) may be produced by a suspension polymerization process, or by a dispersion polymerization process.

According to an embodiment, during sub-step b), at least one filler is added to the powder or pellet in order to intervene on the physical, mechanical and/or chemical-physical properties of the sliding element, or of the cylindrical semi-finished product.

According to an embodiment, the main function of the at least one filler or the plurality of fillers is to further improve the compressive strength, reduce the viscous sliding (creep), increase the wear resistance and/or increase the coefficient of friction of the fluorine-polymer, so as to allow the use of the sliding element in a wider range of applications, for example also for making anti-seismic structural supports where a dissipative action is required to the sliding surfaces.

According to an embodiment, sub-step b) comprises at least a dry mixing of the powder or pellets and the at least one filler.

According to an embodiment, the fillers of sub-step b) are selected from the group consisting of glass in different forms (fibre, powder, hollow spheres, solid spheres, flakes or the like), coal, bronze, steel, graphite, MoS2, carbon fibre, ceramic (alumina, titania, silicon carbide, boron carbide, quartz, boron nitride, or mixtures thereof), mica, polyether-ether-ketone (PEEK), thermoplastic polyimide (PI), a liquid crystal polymer (LCP), polyphenylene sulphide (PPS), polyphenylene sulfone (PPSO2), aramid fibre and mixtures thereof.

According to an embodiment, the compressions of sub-step c) and/or of sub-step d) occur through a mechanical action, for example by pressing.

According to an embodiment, a press is used in sub-step c) and/or in sub-step d).

According to an embodiment, sub-step d) provides a heating at a temperature equal to or higher than 200° C., optionally in the range of 200-450° C., for example between 250-400° C.

According to an embodiment, step ii) includes further sub-steps of:

e) rotating the cylindrical semi-finished product around a cylinder axis;

f) arranging a cutting blade in a position about tangential (or in any case with a reduced incidence angle) to the outer surface of cylindrical semi-finished product;

g) mutually moving the semi-finished product and the cutting blade, so that the latter radially penetrates within said semi-finished product in rotation, so as to peel it with a spiral trajectory and thus obtain the sliding element 8.

According to an embodiment, the rotation axis of the semi-finished product is fixed, and the cutting blade is moved radially towards such a rotation axis.

According to an embodiment, in sub-step g), the movement occurs at a constant speed, so as to laminate a sliding element 8 with a substantially constant thickness.

According to an embodiment, the sliding element 8 of step iii) has a specific density in the range of 2.12-2.17 g/cm3 (where density refers to the variants without fillers).

The sliding element 8) is in the shape of a plate with a maximum thickness S of 8.0 mm substantially constant (with reference to the beginning of their usage life), for example equal to or smaller than 6.0 mm.

Figure 3:
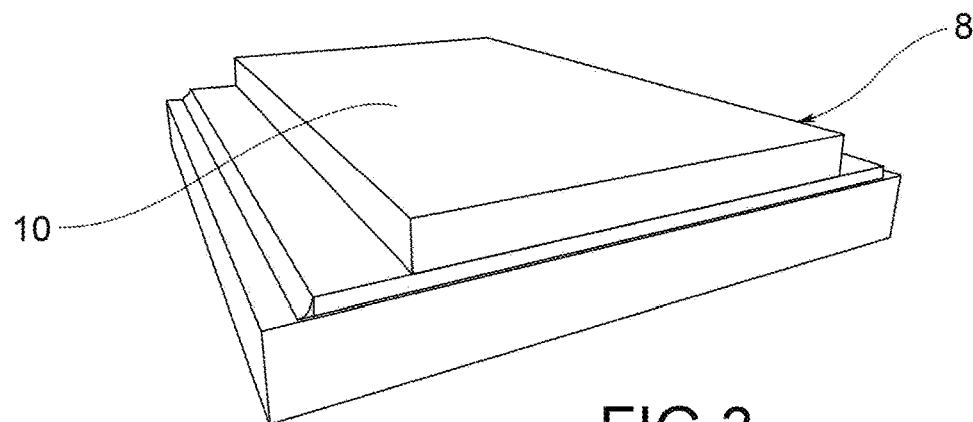
FIGS. 3 and 4 show a sliding element according to various embodiments, for example usable in the support in FIG. 1 or FIG. 2.
Figure 4:
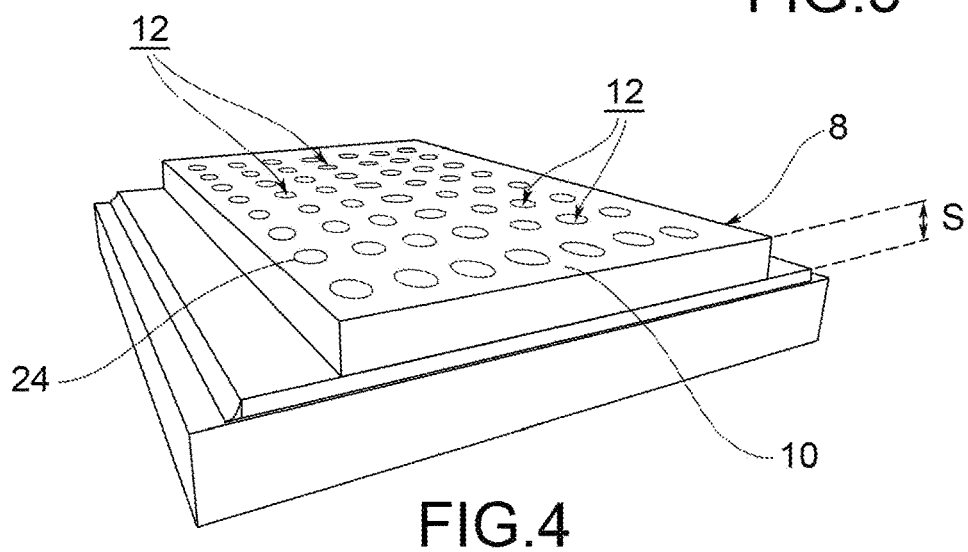

According to an embodiment, the sliding element 8 is in the form of a smooth plate (as shown for example in FIG. 3) or of a plate with niches (such as for example in FIG. 4).

The object of the present invention is also a structural support.

Since a preferred embodiment provides for such a structural support to be obtained through the process just illustrated, such a support may comprise all the features that can be deduced—even implicitly—from the foregoing description, alse the inverse circumstance being also true.

The structural support 1 includes a first support portion 2 delimiting at least one containment compartment 4, 4', second support portion 6 at least partly in front of the containment compartment 4, 4'; and at least a sliding element 4, partly housed in the containment compartment 4, 4' and interposed between the first 2 and the second 6 support portion.

The sliding element 8 substantially consists of a thermo-processable fluoro-polymer—according to the above definition—with a melt-mass flow rate (according to the ISO 1133-1:2011 standard) of 0.2-5.0 grams/10 min and more precisely 0.8-3.0 grams/10 minutes.

According to an embodiment, the sliding element 8 is an element sintered from a thermo-processable fluorine-polymer powder or pellet having a micrometric average particle size of about 0.05-2000 micrometres.

According to an embodiment, the sliding element 8 has a specific density ranging from 2.12 to 2.17 g/cm3.

According to an embodiment, the thermo-processable fluoro-polymer consists of one or more tetrafluoroethylene copolymers (TFE), in which the percentage by weight of TFE in said fluoro-polymer is less than or equal to 98% wt.

According to an embodiment, the thermo-processable fluoro-polymer is selected from the group consisting of tetrafluoroethylene (TFE)-perfluoroalkylvinyl ether (FVE) copolymers, in which the number of carbon atoms of FVE is between 1-5; TFE-hexafluoropropylene copolymers (HPF)-FVE; TFE-HPF copolymers; TFE-ethylene copolymers and TFE-ethylene-propylene copolymers; chlorotrifluoroethylene (CTFE) homopolymers; CTFE-ethylene copolymers; vinylidene fluoride (VdF) homopolymers; VdF-TFE copolymers; VdF-hexafluoroisobutene (FHIB) copolymers, and mixtures thereof.

According to an embodiment, the percentage by weight of TFE in said TFE copolymers is lower than 98% wt, optionally in the range of 75-98% wt, for example in the range 85-98% wt.

According to an embodiment, the thermo-processable fluoro-polymer consists of a grade III-fluorocarbon FEP resin as defined by the ASTM D2116 standard.

As for the ASTM D2116 standard, the reference date of this standard will be the priority date of this patent application.

As regards the definition of the FEP resin, this expression will mean a copolymer of tetrafluoroethylene and hexafluoropropylene.

According to an embodiment, the thermo-processable fluorine-polymer is the polymer CAS n. 25067-11-2.

According to an embodiment, the thermo-processable fluoro-polymer consists of a grade III PFA resin as defined by the ASTM D3307 standard.

As for the ASTM D3307 standard, the reference date of this standard will be the priority date of this patent application.

As regards the definition of the PFA resin, this expression will mean a copolymer of tetrafluoroethylene and perfluoropropylvinylether (PPVE).

According to an embodiment, the thermo-processable fluorine-polymer is the polymer CAS n. 26655-00-5. In some embodiments, the thermo-processable fluoro-polymer is the polymer CAS n. 25067-11-2; or is the polymer CAS n. 9002-84-0 including a percentage equal to or greater than 1% wt, for example 2-10% wt, of a modifying substance such as perfluoropropylvinylether.

According to an embodiment, at least one element surface 10 facing, or in abutting on, the first 2 and/or second 6 support portion is substantially planar and smooth. To this end, see FIG. 3 for example.

According to an embodiment, at least one surface of element 10 facing, or in abutting on, the first 2 and/or second 6 support portion delimits a plurality of recesses (e.g. depressions or bosses) which partially develop towards the inside of the thickness S of such an element 8. To this end, see for example FIGS. 4-6.

According to an embodiment, the recesses 12 are distributed on rows and columns, for example orthogonal to each other.

According to an embodiment, the recesses 12 have a substantially circular perimeter 24, with a diameter D of 7-9 mm.

According to an embodiment, the recesses 12 have a maximum depth P of 2 mm.

According to an embodiment, the distance between centres I1 between the recesses 12 in a first direction X is 13-14 mm.

According to an embodiment, the first direction X is the main sliding direction of the structural support 1.

According to an embodiment, the distance between centres I2 between the recesses 12 in a second direction Y, orthogonal to the first direction X, is 14.5-15.5 mm.

According to an embodiment, the second support portion 6 delimits an abutment (or contact) surface 22 with the sliding element 8.

According to an embodiment, the abutment surface 22 is substantially made of stainless steel, for example 316L steel.

According to an embodiment, the abutment surface 22 substantially consists of polished low-alloy steel.

According to an embodiment, the first 2 and/or the second 6 support portion could be at least partially (for example: completely) made of metal.

According to an embodiment, the first 2 and/or the second 6 support portion could be at least partially (for example: completely) made of a composite material, for example carbon fibre.

The sliding element 8 is in the shape of a plate with a maximum thickness S of 8.0 mm substantially constant (at the beginning of their usage life).

According to an embodiment, the maximum thickness S is equal to or smaller than 6.0 mm.

According to an embodiment, the portion 14 of the sliding element 8 projecting from the containment compartment 4, 4' has a maximum height—with respect to a free edge 16 of the first support portion 2—of at least 2.0 mm.

The object of the present invention will now be described on the basis of some non-limiting examples thereof.

EXAMPLE 1: MANUFACTURE OF A SLIDING ELEMENT SAMPLE ACCORDING TO THE PRESENT INVENTION

15 Kg of PTFE homopolymer powder with an average particle size of 550 microns are loaded inside a mould 1270×1270 mm, compressed by moulding process at 300 Kg/cm2 and subsequently sintered at 370° C. to produce a 5 mm thick PTFE sheet.

Figure 5:
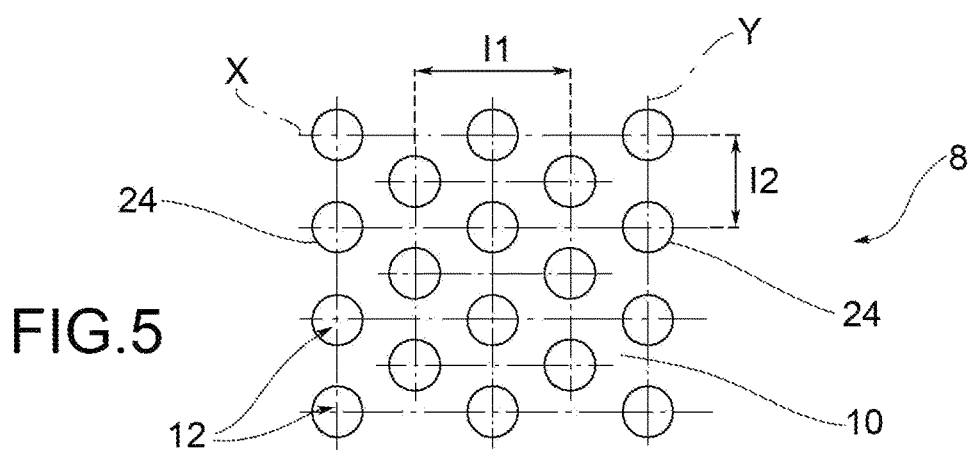
FIG. 5 shows a plan view of the structural element in FIG. 4.
Figure 6:
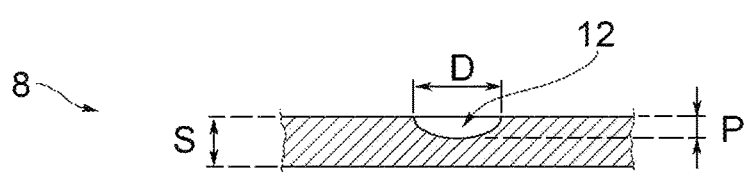
FIG. 6 shows an enlargement of the section through plane VI-VI indicated in FIG. 5.

The sheet thus obtained is cut into discs of 75 mm diameter and 5 mm thick, subsequently honeycombed according to the diagram shown in FIGS. 5 and 6 in order to perform mechanical cold flow tests.

EXAMPLE 2: MANUFACTURE OF A SLIDING ELEMENT SAMPLE ACCORDING TO THE PRIOR ART

A sheet is prepared with the same procedure of example 1 and then circular specimens of 75×5 mm, with PTFE copolymer powder commonly known as modified PTFE. For example, the modified PTFE could be made according to the teaching of document WO2015136457A1.

EXAMPLE 3: MANUFACTURE OF A SLIDING ELEMENT SAMPLE ACCORDING TO THE PRESENT INVENTION

A cylindrical mould with a central mandrel is loaded with pellet (2 mm diameter) of FEP (MFR=2 q/10 min). The mould is then loaded into a furnace and is subjected to a hot moulding process during the sintering cycle (290° C.). After the sintering cycle, a cylinder is extracted from the mould which is transformed into sheets with a thickness of 5 mm by means of a peeling process. As for examples 1 and 2, 75 mm diameter circular specimens are prepared for creep tests.

155 mm diameter circular specimens are also prepared to evaluate the characteristic compressive strength (fk).

EXAMPLE 4: MANUFACTURE OF A SLIDING ELEMENT SAMPLE ACCORDING TO THE INVENTION

Using the same procedure of Example 3, at a sintering temperature of 345° C., samples of 75 mm and 155 mm PFA are produced for cold flow and fk tests (pellets 2 mm–MFR=2 g/10 min).

EXAMPLE 5: MECHANICAL TESTS FOR COMPARISON BETWEEN THE SAMPLES OF EXAMPLES 1-4

All the circular samples of the previous examples are then subjected to cold flow tests according to the parameters shown in the table:

| Parameter | Value |
|---|---|
| Contact pressure with the sliding element | 40 MPa |
| Duration of preload | 1 hour |
| Test temperature | 60 ± 3° C. |
| Sliding distance (for each stroke) | 25.4 mm |
| Number of cycles (2 strokes) | 36000 |
| Average sliding speed | 5 mm/s |

Sample diameters are measured before testing with an accuracy of about 0.01 mm. The samples are placed in a steel undercut seat with a depth of approximately 2.35 mm, leaving a nominal projection of the sample outside the seat of about 2.80±0.20 mm. The mating surface, which lies in a creeping position on the sample, is made of stainless steel with a maximum roughness of Ry≤1 µTTI. The surface of the samples is lubricated with the KLUBER SYNTHESO 8002 silicone lubricant, lot n. KA00026455/80.

A uniform surface of 40 MPa is applied to each sample, and is kept constant during the tests.

The mating surface is moved forward and backward according to a sinusoidal waveform.

The width of the movement is equal to 25.4 mm with a frequency of 0.1 Hz, which corresponds to an average sliding speed of 5.0 mm/s.

The test is conducted at a temperature of 60±3° C., continuously measured during the test at the mating surface of stainless steel.

The test ends 100 hours after the start, which corresponds to about 36000 cycles, after which each sample is extracted from the seat and its diameter is measured after 24 hours from the extraction.

The results are shown in the following tables.

Cold flow test (values expressed in mm):

| | Dimensional variation after test | | | |
|---|---|---|---|---|
| Dimensions | Ex. 1* | Ex. 2 | Ex. 3 | Ex. 4 |
| Diameter (sliding direction) | — | +7.29 | +2.25 | +1.87 |
| Diameter (direction perpendicular to sliding) | — | +6.28 | +2.50 | +1.80 |
| Average diameter | — | +6.785 | +2.375 | +1.835 |
| Average thickness | — | −0.457 | −0.25 | −0.195 |

*For the samples of example 1 it was not possible to carry out the measurements due to the excessive deformation thereof.

From the previous table it can be observed that the results of the sample of example 3 and example 4 allow obtaining substantially better results with respect to a PTFE according to the prior art (example 2).

In fact, as well exemplified by the numerical values, the sliding element according to this invention undergoes a flattening and a displacement outside the seat much smaller than the traditional PTFE.

Characteristic Compressive Strength Test (Fk, in MPa):

| Properties | Ex. 1* | UHMWPE** | Ex. 3 | Ex. 4 |
|---|---|---|---|---|
| fk | 90 | 180 | 160 | 180 |

*reference value reported in the EN1337-2 standard;
**characteristic value declared by the manufacturers of sliding elements in UHMWPE (for a sample with the same geometrical characteristics stated in example 1).

Also with regard to the compressive strength, the fluoropolymer according to the invention allows obtaining resistance values equal to UHMWPE which traditionally is used as an alternative to PTFE.

Nevertheless, as stated at the beginning, this type of polyethylene is disadvantageous in terms of greater rigidity at low temperatures, greater hygroscopicity and oxidation which could accelerate ageing.

Innovatively, the process and the structural support object of the present invention provide fluoropolymers that are more performing than the known fluoropolymers used in this field of the art.

More specifically, the authors of this invention have been able to identify a plurality of new polymers which, in common with the claimed MFR parameter, provide the characteristic compressive properties (fk) and the desired cold flow properties.

Advantageously, the sliding element object of the present invention has a combination of extremely desirable features, in particular high compressive strength, high resistance to chemical agents, and substantial inertness to atmospheric agents.

Advantageously, the structural support object of the present invention is suitable for being used in a wider temperature range with respect to PTFE and conventional polymers.

Advantageously, the use of dry mixing and at room temperature allows avoiding treatments at high temperatures, which could lead to a reduction of the molecular weight of the fluoropolymer, and which would compromise the mechanical properties thereof.

Advantageously, the structural support object of the present invention is suitable for being manufactured with an overall reduced weight with respect to the prior art, at least for the same structural features.

Advantageously, the structural support object of the present invention is not subjected to ageing processes due to oxidative phenomena and exposure to atmospheric agents.

A man skilled in the art may make several changes or replacements of elements with other functionally equivalent ones to the embodiments of the process and structural support in order to meet specific needs.

Also such variants are included within the scope of protection as defined by the following claims.

Moreover, each variant described as belonging to a possible embodiment may be implemented independently of the other variants described.

The invention claimed is:
1. Structural support comprising:
a first support portion delimiting at least one containment compartment;
a second support portion at least partly in front of the containment compartment;
at least one sliding element, partly housed in the containment compartment and interposed between the first support portion and the second support portion;
wherein the sliding element substantially consists of a thermo-processable fluoro-polymer with a melt-mass flow rate (MFR)—according to the ISO 1133-1:2011 standard—of less than 5.0 grams/10 minutes, and wherein the thermo-processable fluoro-polymer consists of one or more tetrafluoroethylene (TFE) copolymers, where the percentage by weight of TFE in the TFE copolymer is less than 98%.

2. Structural support according to claim 1, wherein the sliding element is an element sintered from a powder or a pellet of thermo-processable fluoro-polymer having an average micrometer particle size of about 0.05-2000 micrometers, and wherein said element has a specific density in the range of 2.12-2.17 g/cm3.

3. Structural support according to claim 1, wherein the thermo-processable fluoro-polymer is a copolymer of tetrafluoroethylene and hexafluoropropylene, wherein the percentage by weight of the tetrafluoroethylene in the copolymer is at least 75% and less than 98%.

4. Structural support according to claim 1, wherein the thermo-processable fluoro-polymer is selected from the group consisting of: tetrafluoroethylene (TFE)-perfluoroalkylvinyl ether (FVE) copolymers, in which the number of carbon atoms of FVE is between 1-5; TFE-hexafluoropropylene copolymers (HPF)-FVE; TFE-HPF copolymers; TFE-ethylene copolymers and TFE-ethylene-propylene copolymers; vinylidene fluoride (VdF)-TFE copolymers; and mixtures thereof.

5. Structural support according to claim 1, wherein the thermo-processable fluoro-polymer is the polymer CAS n. 25067-11-2; or is the polymer CAS n. 9002-84-0 including a percentage greater than 2% wt of perfluoropropylvinylether.

6. Structural support according to claim 1, wherein at least one element surface facing towards or in abutment with the first support portion or second support portion, or both, defines a plurality of recesses, which partly develop towards an interior of a thickness of said element, said recesses having a substantially circular perimeter with a diameter of 7-9 mm, a maximum depth of 2 mm, and wherein a distance between centres between said recesses in a first direction is 13-14 mm and a distance between centres in a second direction, orthogonal to the first direction, is 14.5-15.5 mm.

7. Structural support according to claim 6, wherein the second support portion delimits an abutment surface with the sliding element, said surface substantially consisting of polished stainless steel.

8. Structural support according to claim 1, wherein the sliding element is in the shape of a plate with a maximum, substantially constant thickness of 8.0 mm, at the beginning of its usage life, and wherein a portion of the sliding element projecting outside the containment compartment has a maximum height—with respect to a free edge of the first support portion—of at least 2.0 mm.

9. Structural support according to claim 1, wherein the first support portion or the second support portion, or both, are at least partially made of a composite material.

10. Structural support according to claim 1, wherein the sliding element substantially consists of a thermo-processable fluoro-polymer with a melt-mass flow rate (MFR)—according to the ISO 1133-1:2011 standard—of less than 3.0 grams/10 minutes.

11. Process for the production of a structural support according to claim 1, comprising the steps of:
  i) providing a first support portion delimiting at least one containment compartment;
  ii) providing a sliding element substantially consisting of a thermo-processable fluoro-polymer with a melt-mass flow rate (MFR)—according to the ISO 1133-1:2011 standard—of less than 5 grams/10 min;
  iii) partly housing the sliding element in the containment compartment;
  iv) placing at least part of a second support portion in front of the containment compartment, so that the sliding element is interposed between said first support portion and said second support portion.

12. Process according to claim 11, wherein step ii) comprises the sub-steps of:
  a) providing a powder or a pellet of a thermo-processable fluoro-polymer having an average micrometric particle size of about 0.05-2000 micrometres;
  b) optionally dry mixing one or more fillers, of the organic or inorganic type, or both, with said powder or pellet;
  c) compacting the powder or pellets of sub-step a) or the product of sub-step b) by compression;
  d) hot compression sintering the product of sub-step c) to obtain the sliding element or a cylindrical semi-finished product.

13. Process according to claim 11, wherein step ii) comprises the further sub-steps of:
  e) rotating the cylindrical semi-finished product around a cylinder axis;
  f) arranging a cutting blade in a position about tangential to the outer surface of cylindrical semi-finished product;
  g) mutually moving the semi-finished product and the cutting blade, so that the cutting blade radially penetrates within said semi-finished product in rotation, so as to peel it with a spiral trajectory and thus obtain the sliding element.

14. Process according to the claim 13, wherein in sub-step g), said movement occurs at a constant speed, so as to laminate a sliding element with a substantially constant thickness.

15. Process according to claim 11, wherein the sliding element of step iii) has a specific density in the range of 2.12-2.17 g/m3.

16. Process according to claim 11, wherein the sliding element is in the shape of a plate with a maximum, substantially constant thickness of 8.0 mm, at the beginning of its usage life.

* * * * *